US007283156B1

(12) United States Patent
Morgan

(10) Patent No.: US 7,283,156 B1
(45) Date of Patent: Oct. 16, 2007

(54) AIRBORNE IMAGING SYSTEM AND METHOD

(75) Inventor: Scott E. Morgan, St. Paul, MN (US)

(73) Assignee: Lockheed Martin Corporation, St. Paul, MN (US)

(*) Notice: Subject to any disclaimer, the term of this patent is extended or adjusted under 35 U.S.C. 154(b) by 752 days.

(21) Appl. No.: 10/662,128

(22) Filed: Sep. 12, 2003

Related U.S. Application Data

(60) Provisional application No. 60/410,148, filed on Sep. 12, 2002.

(51) Int. Cl.
*H04N 7/18* (2006.01)
*H04Q 7/00* (2006.01)

(52) U.S. Cl. .................. 348/144; 340/539.26

(58) Field of Classification Search ............. 348/144, 348/164, 355; 244/30, 96, 145; 340/539.26, 340/539.17; 89/41.05
See application file for complete search history.

(56) References Cited

U.S. PATENT DOCUMENTS

| 5,174,527 A | 12/1992 | Kasher |
| 5,339,742 A | 8/1994 | Hulderman et al. |
| 5,432,546 A | 7/1995 | Cargill |
| 5,537,909 A | 7/1996 | Schneider et al. |
| 5,537,928 A | 7/1996 | Schneider |
| 7,005,982 B1 * | 2/2006 | Frank .................... 340/539.26 |
| 7,055,777 B2 * | 6/2006 | Colting ....................... 244/30 |

FOREIGN PATENT DOCUMENTS

EP 466499 A1 * 1/1992

* cited by examiner

*Primary Examiner*—Gims Philippe
(74) *Attorney, Agent, or Firm*—Brooks, Cameron & Huebsch, PLLC

(57) ABSTRACT

The airborne imaging system of the present invention includes a blister housing attached to a host vehicle. At the appropriate time in flight, a sensor suite is deployed from the blister housing. The sensor suite is eccentrically weighted to induce a pendular motion as it is suspended from a paradevice. To increase the imaging footprint of the system, the paradevice is designed for angular motion and the look down angle of the imaging system can be adjusted from the vertical. The data is broadcast to a receiving station that processes individual frames to create a continuously updated mosaic of the area of interest.

27 Claims, 5 Drawing Sheets

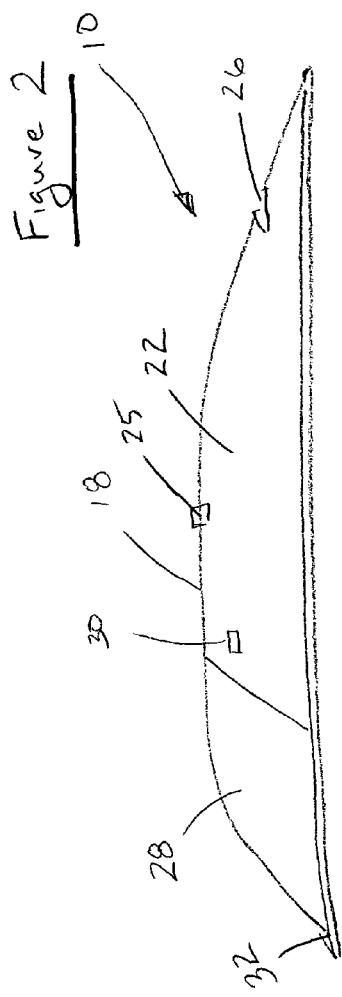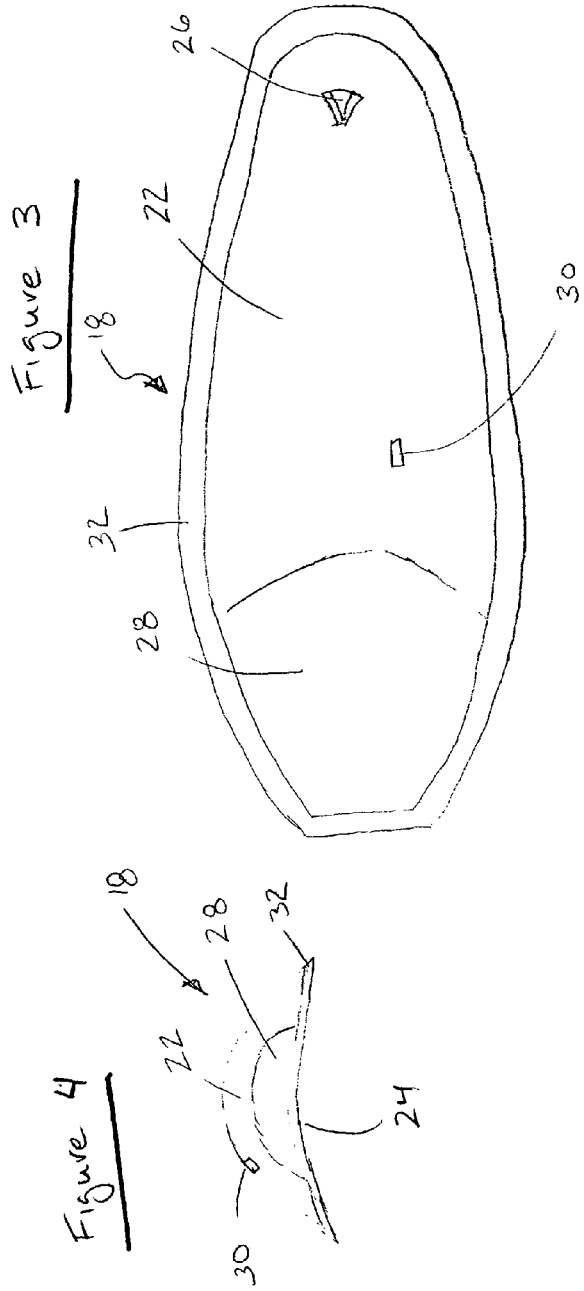

AIRBORNE IMAGING SYSTEM AND METHOD

PRIORITY CLAIM

The present application claims priority to U.S. Provisional Application No. 60/410,148 entitled, "EXPENDABLE BOMB DAMAGE ASSESSMENT SYSTEM", filed Sep. 12, 2002, and herein incorporated by reference in its entirety.

FIELD OF THE INVENTION

The present invention relates generally to surface imaging systems and more particularly to a system for producing images of the ground or water from an airborne platform.

BACKGROUND OF THE INVENTION

There is a need to provide military planners and active ground forces with real time assessment imaging of an area of interest. Specifically, this would include a system for immediately determining the effectiveness of a bombing mission. Current damage assessment practice frequently requires the deployment of high value assets to collect imagery data of the effectiveness of a bombing mission or artillery fire mission. Preferably, a low cost real time option would allow immediate feedback for every mission without endangering other assets.

Current methods of obtaining damage assessments include manned reconnaissance aircraft, unmanned air vehicles, satellites, and ground forces. Unmanned air vehicles (UAV's) have been used to carry cameras that either record or relay imagery back to an operating base. The unmanned air vehicles are relatively large and expensive. There is also some concern regarding the sophisticated imaging systems onboard the UAV should it be knocked down and recovered by an opposing force. Logistics involving UAV placement is also problematic. Coordination of the flight of the UAV with the attack of the target area is required, and the target location must be within the operating/data transmission range of the UAV.

Reconnaissance aircraft provide the most common method of bomb damage assessment. They generally operate at high altitude and require clear weather to assess the target area. In essence, reconnaissance aircraft represent a very expensive long-range version of an unmanned air vehicle. Low-level reconnaissance missions are riskier. After a bombing mission, an opposing force is generally on notice that a reconnaissance mission may follow thus increasing the danger to the crew of attracting enemy fire. Moreover, low level reconnaissance missions do not allow for loiter time over the impact area unless the mission occurred over a low hazard area.

Satellites incorporating television or infrared cameras are the safest method for bomb damage assessment. However, imaging results are dependent upon good weather in target areas. There may also be a time delay in receiving the data until the satellite is in range of the target area or conversely, a mission may have to be delayed until the satellite can provide coverage. Satellites are relatively expensive to operate and target. Redirecting the imagery devices on the satellites often requires multiple layers of administrative approval.

The most dangerous method of damage assessment involves the deployment of ground forces to the impact site. While on site examination may provide the greatest detail, it is frequently impossible due to the position of existing forces. Furthermore, ground forces may not have the vantage point of viewing an entire target area. When time is of the essence, it may be impractical to delay reporting until the opposing force has cleared the impact area.

Various alternative damage assessment systems have been developed. For example, a damage assessment system utilizing an inflatable balloon strapped to a bomb is described in U.S. Pat. No. 5,537,928 and a sensor tethered to a gravity bomb is described in U.S. Pat. No. 5,432,546. Both examples however are needlessly complicated and expensive for a system that will clearly wind up either destroyed or in enemy hands. Furthermore, the tethered system has an extremely short broadcast window before impact and the helium balloon system actually produces lift which may carry the sensor away from the impact area if a guidance mechanism is not included.

To provide control, a remote control glider was proposed in U.S. Pat. No. 5,537,909 as the means for loitering above the target. The delivery vehicle was a retrofitted Tomahawk cruise missile. The glider was equipped with programmable tracking and guidance electronics as well as means for controlling the flight path. Besides the cost and complexity of the electronics package, mission success requires proper deployment and control of the glider.

Therefore, there is a need for a family of relatively inexpensive expendable sensors that provide immediate bomb damage assessment. The sensor should replace the additional assets currently involved in collecting imagery after a bombing mission. The sensor package should be inexpensive and contain technology available on the open market due to its eventual capture by an opposing force. The expendable sensor should allow for a longer loiter time in the immediate vicinity of the impending explosion for the collection and transmission of data imagery during impact, after secondary explosions and during or after debris settles on the target area. The expendable sensor should provide a data link to an operating ground station or airborne control such that risk to life and damage to high value assets is avoided. The real time transmission of data should be produced in an easily transmittable format that can quickly be interpreted. In addition to operational assessments, the sensors should be easily configured to assist in the development, operational test and evaluation of new bombs without the high cost of instrumenting a chase delivery vehicle.

SUMMARY OF THE INVENTION

The expendable bomb damage assessment system of the present invention is a cost effective and timely device for providing video imagery of a target area both before and after the impact of a bomb. The sensor suite containing the imagery equipment is contained within a housing attached by a pressure adhesive to a host delivery vehicle. The imagery equipment can include video cameras and infrared (IR) sensors. The system may be retrofitted to adhere to traditional dumb bombs, guided bombs, or UAVs. Once attached, the present invention can be autonomously powered such that there may be no external power requirements for the system. In one autonomously powered embodiment, an inlet on the leading face of the housing directs airflow to an impeller generator. The power produced can allow the command unit to operate for deployment of the sensor suite.

At the appropriate time in flight, the command center within the housing can release a simple electronic switch to open a payload cover. Once opened, the sensor suite is then jettisoned from the host bomb mechanically, pneumatically, or otherwise. In one embodiment, a streamer draws a ring vortex parachute out of the sensor suite upon achieving the correct airspeed. As the host vehicle continues its trajectory the sensor suite begins a spiral tracked descent. The sensor suite may be eccentrically weighted to further encourage the creation of a broader footprint. In another embodiment, a parafoil with an aerodynamic control surface could be deployed so as to direct the sensor suite to the impact area.

A camera contained in the sensor suite can be programmed before takeoff with a selected look down angle and field of view so as to encompass the intended target area and surrounding terrain. The camera can be activated soon after deployment and remains active until reaching the ground. The sensor package typically contains a transmitter assembly for forwarding the image data. An antenna can be operably connected to the camera transmitter for transmission of the recorded data. The antenna could stream from the sensor suite, be incorporated in the parachute or parafoil structure, or may be configured otherwise to transmit data. In one embodiment, a chemical battery can power the transmitter. The chemical battery can be designed to last only as long as the expected loiter/impact time at which point the heat generated will ignite/melt nearby components upon landing. The data may be processed through a registration program, which creates a continually updated mosaic of the target area. The processing terminal can be the size of a laptop computer thus allowing for both ground or airborne receivers. Security concerns for the sensor suite can be alleviated by the use technology which is intended to be destroyed due to the landing force and/or the heat generated by the chemical battery as will be understood by those skilled in the art.

BRIEF DESCRIPTION OF THE DRAWINGS

FIG. 2 is a side perspective view of the Bomb Damage Assessment System.

FIG. 3 is a top perspective view of the Bomb Damage Assessment System.

FIG. 4 a trailing edge perspective view of the Bomb Damage Assessment System.

DETAILED DESCRIPTION OF THE DRAWINGS

Figure 1:
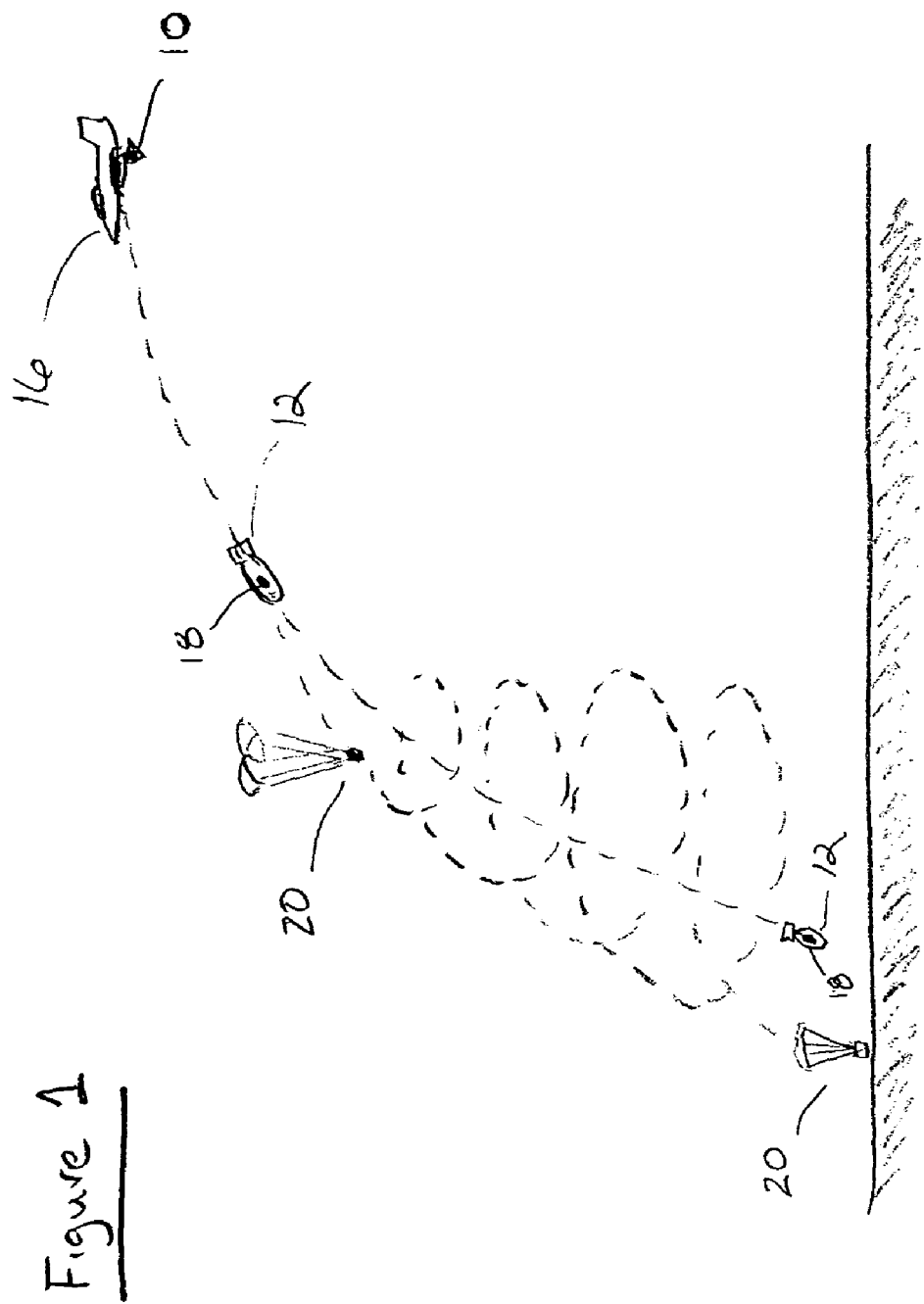
FIG. 1 illustrates the typical deployment scenario of a bomb jettisoned from a delivery aircraft and the subsequent release of the Bomb Damage Assessment System.

An airborne imaging system 10, in accordance with the present invention, is particularly illustrated throughout the figures in the form of a bomb damage assessment system. As illustrated in FIG. 1, the airborne imaging system 10 of the present invention is deployed by an airborne host vehicle 12, such as a gravity bomb or a missile, released from an airplane 16. It is envisioned that the present invention 10 can be attached to guided munitions and UAVs. The airborne imaging system 10 is comprised of two major components, the blister housing 18 and the sensor package 20. The blister housing 18 is attached to the external surface of an aircraft or munition, such as bomb 14. The blister housing 18 is typically attached to the external surface using an adhesive, such as a pressure sensitive adhesive. However, the blister housing 18 may be attached to the external surface using a variety of methods which will be recognized by those skilled in the art upon review of the present disclosure. The entire blister housing 18 may entirely or partly flexible to conform to the host vehicle, it may be rigid and shaped to conform to the host vehicle 14, or may be otherwise configured as will be understood by those skilled in the art. At the appropriate time in flight, the sensor package 20 is deployed from the blister housing 18. The sensor package 18 then drifts to the ground while transmitting video or other data images to a remote receiver unit. The receiver may be on the host airplane 16, a second airplane such as an airborne command center, or a forward ground station.

As illustrated in FIGS. 2-4, the blister housing 18 has an outer surface 22 and a mating surface 24. The outer surface 22 may have a generally parabolic cross section with a decrease in curvature around the periphery so as to intersect the mating surface 24. The outer surface 22 is typically shaped to limit aerodynamic drag during deployment. However, the blister housing 18 may take alternate shapes according to attachment methods and aerodynamic forces experienced by the host vehicle. The outer surface 22 further includes at a first end an air inlet 26 and a payload cover 28 at the opposing end. In one aspect, the air inlet 26 may be a National Advisory Committee on Aeronautics (NACA) style inlet.

The mating surface 24 typically has a generally continuous parabolic shape to match the outer surface of a bomb 14. However, the mating surface 24 may have an alternate shape as will be recognized by those skilled in the art.

In one embodiment, the outer surface 22 is preferably aligned on the host vehicle 14 such that the air inlet 26 is directed into the slipstream and a payload cover 28 is aft. External electrical access 30 to the self-contained sensor package 20 would be available for preprogrammed launch, deployment and target data. In one aspect, the entire blister housing 18 may be flexible to conform to the host vehicle 14. It is further envisioned that the area of intersection between the outer surface 22 and the mating surface 24 maybe a flexible ring 32 to eliminate openings (ie., air gaps) between the blister housing 18 and the host vehicle 14 which would tend to separate the blister housing 18 from the host vehicle 14 when in free fall.

The external size of the blister housing 18 is minimized to reduce aerodynamic forces on the host vehicle 14. Aerodynamic loads on the blister housing 18 will determine the structural characteristics required for the structure and its attachment to host vehicle 14. For example, the aerodynamic forces experienced by the blister housing 18 when attached to a UAV with a maximum speed of 120 knots are dramatically less than a blister housing 18 attached to bomb on an F-15 fighter. Additionally, there may be impact loads associated with the environment or bomb deployment mechanisms that require structural modifications.

Figure 5:
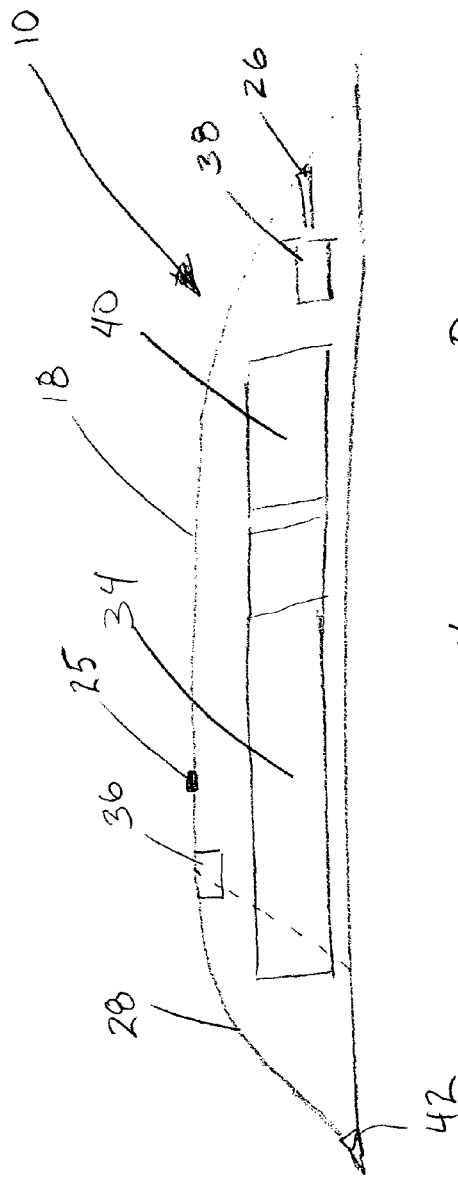
FIG. 5 is a cross sectional view of the Bomb Damage Assessment System.

FIG. 5 illustrates an internal layout of blister housing 18. The internal dimensions of the blister housing 18 are sized to accommodate the sensor payload 34, payload eject mechanism 36, the power unit 38 and the command/control system 40.

The payload eject mechanism 36 is operably connected to the payload cover 28 on the blister housing 18. The payload cover 28 opens by way of a hinge mechanism 42 disposed within the trailing edge of the blister housing 18. In one aspect, a solenoid switch, triggered by the command/control system 40 will release the forward edge of the payload cover 28. The internal pressure within the blister housing 18 should be greater than the ambient pressure due to the compressed airflow of the air inlet 26. When the payload cover 28 opens the sensor payload 34 will be propelled out of the blister housing 18 due to the pressure differential. In the alternative, a mechanical system such as a spring assembly could be used to deploy the sensor payload 34.

The power unit 38 preferably operates independent of the host aircraft 12. In a first embodiment, an air inlet 26 or scoop is disposed near the front leading edge of the blister housing 18. The air inlet 26 is a flush mounted with the exterior surface of the blister pack. The inlet 26 is curved so that the air will spill into the low-pressure area of the inlet with the correct vortex flow to attach it to the inlet sides and bottom and thereby direct air into the power unit 38. The power unit 38 can include an internal impeller assembly to generate power for the command section. Alternatively, power could be supplied by way of a commercial battery system. The power unit 38 may also provide housekeeping power to the payload prior to deployment.

The command/control system 40 includes a sensor section and a programmable processor for determining deployment. The sensor section may include an air speed indicator, an altimeter and appropriate probes to monitor the position of the bomb 14 during its descent. Additional probes also may be located within this section for assisting in the deployment of the payload. It is envisioned that the command/control section 40 will have a simple user interface system so that a technician can program the mission profile into the microprocessor prior to deployment of the host vehicle 12. The appropriate deployment timing can then be determined based on the mission.

Alternatively, the command/control system 40 can have a serial interface to an inertial navigation system housed as part of the sensor package so as to provide greater control over the descent. External electrical access 30 provides means to communicate with both the command/control center 40 and the self-contained sensor payload 34 for preprogrammed launch, deployment and target data. The command/control section 40 could also contain a simply fuse like device that deploys the sensor payload 34 at a given altitude, a given airspeed, or a given time after release from the host. The command/control section 40 is powered by the power unit 38, or in the alternative a battery.

Figure 6:
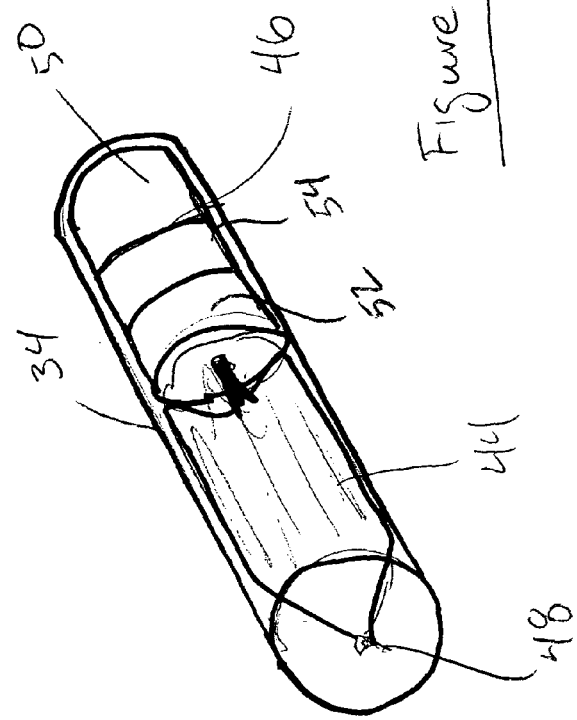
FIG. 6 is cut away perspective view of the sensor package of the Bomb Damage Assessment System.

The major portion of the blister housing 18 contains the sensor payload 34. It is envisioned that the sensor payload 34 will be a prepackaged unit sized appropriately for the blister housing 18. As illustrated in FIG. 6, the sensor payload 34 includes a streamer/parachute unit 44 connected to a sensor 46. The parachute unit 44 will be packaged within a protective container or bag 48. The sensor 46 will be designed to withstand the aerodynamic loads encountered within the host vehicle 12 flight profile and the shock and vibration associated with the transportation and deployment. In addition, the internal components of the sensor 46 will be designed to withstand the positive pressure created by the air inlet 26.

The sensor 46 will contain an imaging system 50, such as a video camera, and/or an IR sensor operably connected to a transmitter 52. A chemical battery 54 may power the entire unit. The chemical battery 54 could be triggered by the parachute lanyard 25 attached to the host vehicle 12. The chemical battery 54 should provide sufficient power for the duration of the drift to the ground (approximately 300-500 seconds). An added advantage with the chemical battery 54 is the heat involved in generating power will eventually destroy much of the internal processors of the sensor 46 upon reaching the ground.

Figure 7:
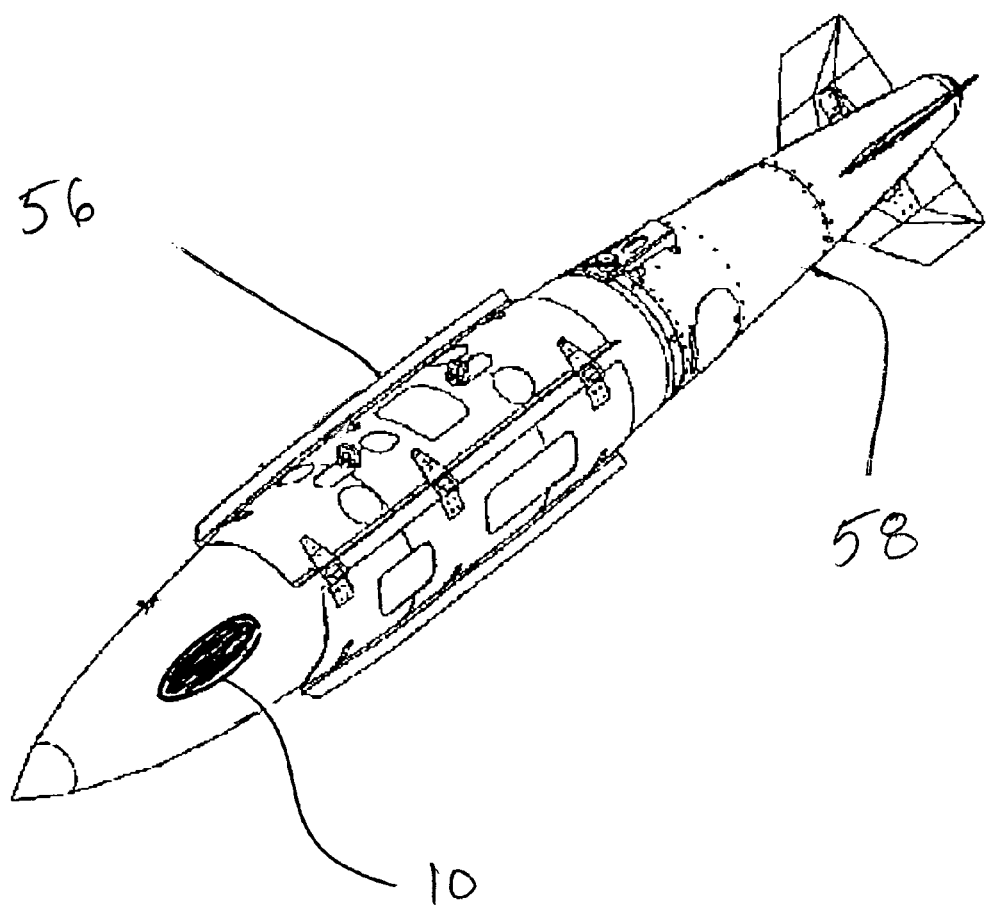
FIG. 7 is a perspective view of a GBU-32 JDAM Bomb with Bomb Damage Assessment System attached.

It is understood that the weight and position of the blister housing 18 imposes additional forces on the host vehicle 12. Ideally, these forces can be accommodated in the flight profile if the host vehicle 12 has active control surfaces. As illustrated in FIG. 7, the airborne imaging system 10 is disposed on a munition 56 containing a Joint Direct Attack Bomb (JDAM) 58. The JDAM 58 includes an onboard guidance system to correct bomb trajectory after release. The JDAM 58 can be used with virtually all Air Force fighters and bombers, for example, the B1, B2, B52, F15E, F16, F22, F117 and the Navy F/A-18. Prior to take off, a technician will program the airborne imaging system 10 for the proper deployment altitude based on the JDAM 58 mission profile. When that altitude is reached, the sensor payload 34 will be deployed and the sensor 46 can begin transmitting data. Alternatively, the airborne imaging system 10 can be configured for deployment on any free fall bomb, or other munitions or aircraft.

Figure 8:
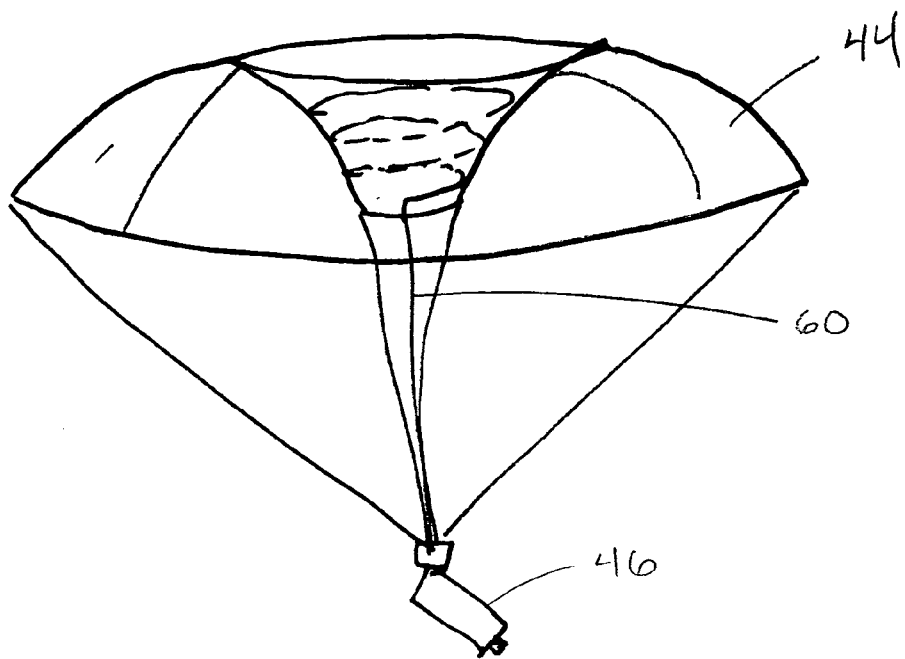
FIG. 8 is a perspective view of a ring vortex parachute containing a spiral collinear antenna.

FIG. 8 depicts the sensor 46 as it is suspended below a parachute unit 44, depicted as a ring vortex parachute. The parachute unit 44 is designed with open panels so that it falls in a spiral. In one embodiment, the parachute unit 44 configured as a ring vortex parachute may include a collinear or Yagi antenna 60 with the wires sewn into the parachute fabric.

The sensor 46 is typically configured to spin as the parachute unit 44 spins in order to cover as large a ground footprint as possible, such as for example in a daisy-like pattern. For example, the sensor 46 can be eccentrically weighted to generate a swing. The other variables for determining ground footprint are deployment altitude, camera field of view in degrees, the camera look down angle, and the range to the impact point at time of deployment. Generally, the combination of the look down angle of the sensor 46 and the daisy-like pattern will produce a video footprint greater than one kilometer across. The footprint can be further adjusted by the size of the camera lens. It is assumed that the sensor 46 will strike the ground with sufficient force to damage and/or destroy the optics.

Figure 9:
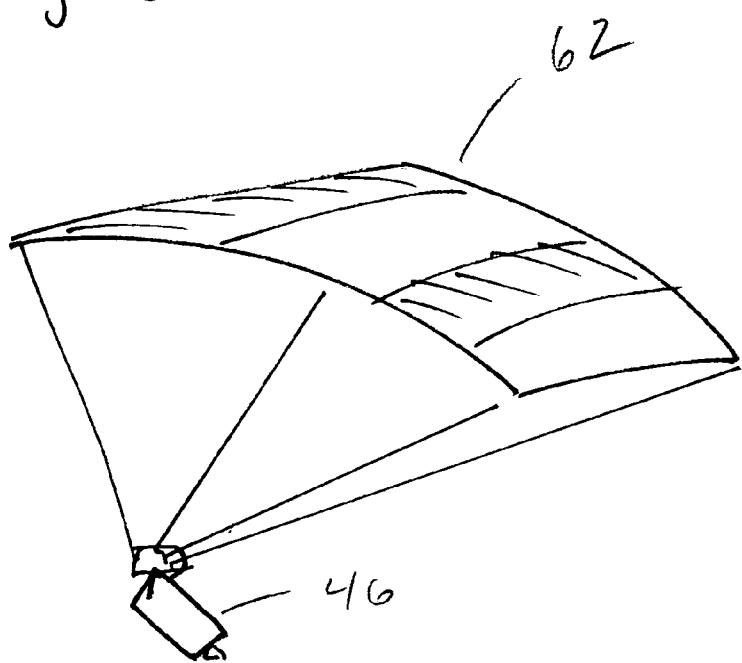
FIG. 9 is a perspective view of the parafoil embodiment of the present invention.

An alternate parafoil design 62, as illustrated in FIG. 9, would add a glide aspect to the descent of the sensor 46. The ability to provide directional control would offset the effect of wind about the target. Ground coverage by the sensor 46 would increase but so would cost and complexity in managing the descent. For example, such an alternate embodiment may include a micro inertial navigation system (INS).

The sensor 46 will record images during the descent which are broadcast through transmitter 52. Processing the images through a specially designed image processing algorithm suite installed into the receiver terminal enhances performance of the present invention 10. The algorithm will be used to convert the real video data into an image mosaic made up of individual video frames. The data will provide a broad picture of the impact area by adding each new video frame to a larger screen. The frames will be updated continuously as the camera swings under the parachute 44 and sensor 46 falls in a daisy-like pattern. The overall image will consequently have sections created at different times. Moreover, the video frames can be geo-registered by the processor so that terrain features remain a constant while vehicles and/or moving ground forces are displayed in motion.

The airborne imaging system 10, through the imaging system 50 will transmit a scanned image in either color or black and white of the target area before and after impact of the host vehicle 12. Transmission of data can be compatible with broadband communication requirements aboard P-3, C-130 or other probable airborne or ground based command centers. Processed data can be compatible with tactical communication systems so that downloads are available to a multitude of users.

It is envisioned that the imaging system 50 will have approximately 300 to 500 seconds to film before it impacts the ground. After the sensor 46 reaches the ground there is little of value on board and the chemical battery 54 can destroy nearby components. The modem and sensor control program can be configured so that the last line in the program code erases the program. The imaging system 50 will be a commercial off the shelf design and will likely be damaged by impact with the ground.

In operation, the airborne imaging system 10 is designed to be low cost and easily operated so as to be economical for any type of mission. A technician in charge of preparing the host vehicle 12 would take an alcohol wipe and clean the surface of the host vehicle 12 where the blister housing 18 is to be applied. After the surface is allowed to dry, the technician uses a template to mark the proper location on the host vehicle 12 for the blister housing 18. The technician then may select: the transmit frequency for the airborne imaging system 10; an encryption key, color coded with a dipswitch; and the proper parachute deployment profile. In an alternate embodiment, the technician may also program possible target locations into the system.

The blister housing 18 is adhered on the host vehicle 12 at the proper location using the template. Positioning of the blister housing 18 should be in accordance with the calculated center of gravity so as not to disturb the aerodynamic characteristics of the host vehicle 12 beyond what is acceptable for the host vehicle's flight profile. As an option, an aerodynamic adhesive tape, capable of withstanding the flight profile of the delivery airplane 16, is applied to the seam where the blister housing 18 engages the host vehicle 12. The blister lanyard 25 is then attached to the appropriate lanyard hook on the airplane 16.

As the host vehicle 12 departs the airplane 16, the lanyard 25 can trigger the power unit 38 and the chemical battery 54. As the host vehicle 12 accelerates to approximately 1,000 feet per second, an internal impeller within power unit 38 can be driven by air funneled by the air inlet 26. The power unit 38 provides current to arm and program the expendable command/control system 40.

The sensors of the command/control system 40 determine proper deployment altitude. The command/control system 40 provides direction as to activation of the payload cover 28. The air inlet 26 may provide a positive air pressure within the blister housing 18 so that when the payload cover 28 is opened the payload 34 is propelled out of the blister housing 18. A streamer extends from the parachute bag 48 and pulls the parachute unit 44 from the sensor 46. A protective bag 48 is used to protect the parachute fabric from fusing together at expected deployment velocities. The parachute unit 44 and sensor 46 decelerate to a parachute opening speed of approximately 500 feet per second.

In a first embodiment, the parachute unit 44 comprising a ring vortex parachute contains a built in antenna 60 which also is activated upon opening the parachute unit 44. The antenna 60 would form a spiral cone within the upper surface of the parachute unit 44 capable of transmitting data at ranges up to forty kilometers. Alternate antenna layouts may be used different parachute designs and different missions. If parafoil 62 (FIG. 9) is used, a Yagi antenna may be preferred.

In one embodiment, a receiver terminal receives, records, and stabilizes the sensor data. The video and telemetry are superimposed to make a composite image. The video is stitched into a single picture with a sensor update ellipse. The ellipse is a colored boundary which shows the viewer the most recently transmitted scenes. The composite image is built with magnetic north as up. The daisy-like motion created by the parachute/camera combination will provide an image covering thousands of square feet in which the impact point will be easily seen. A simple laptop terminal can be used to view the imagery. The processed imagery can then be broadcast as digital output to the Ethernet.

The present invention has been particularly described in the form of a bomb damage assessment system for simplicity and ease of explanation. Those skilled in the art will understand that these particularly described embodiments merely illustrate exemplary embodiments for a particular application. Various alternative arrangements and configurations can be readily devised by those skilled in the art upon review of the present disclosure without departing from the scope of the invention. Particularly, those skilled in the art will understand that the present invention has a wide range of applications in the area of aerial imaging. The scope of the present invention is set forth in the appended claims.

What is claimed is:

1. An airborne imaging system comprising:
   a blister housing disposed on a host vehicle; said blister housing having a leading end, a trailing end and a payload area, the leading end aligned with a leading end of the host vehicle:
   an air inlet defined by the leading end of said blister housing;
   an air channel connecting the air inlet to a power unit disposed within the blister housing;
   a command/control system disposed within the payload area operably powered by the power unit; and
   a payload ejection system operably coupled to the command center for releasing an assessment system from the payload area; said assessment system including an imaging system, a transmitter and a parachute.

2. The airborne imaging system of claim 1 wherein the host vehicle is a gravity bomb, a remotely piloted vehicle, or a missile.

3. The airborne imaging system of claim 1 wherein the blister housing includes a mating face and an external face, said mating face covered by a pressure mounted adhesive layer for adhering to an external surface of the host vehicle.

4. An airborne imaging system comprising:
   a blister housing disposed on a host vehicle; said blister housing having a leading end, a trailing end and a payload area, the leading end aligned with a leading end of the host vehicle, where the blister housing includes:
     a mating face and an external face, the mating face covered by a pressure mounted adhesive layer for adhering to an external surface of the host vehicle; and
     an aerodynamic tape layer partially disposed on the external face, said aerodynamic tape layer having a distal end that overhangs the circumference of the blister housing for adhering to the host vehicle;
   an air inlet defined by the leading end of said blister housing;
   an air channel connecting the air inlet to a power unit disposed within the blister housing;
   a command/control system disposed within the payload area operably powered by the power unit; and a payload ejection system operably coupled to the command center for releasing an assessment system from the payload area: said assessment system including an imaging system, a transmitter and a parachute.

5. The airborne imaging system of claim 1 wherein the blister housing includes an external interface connector for communication with the command/control system before deployment.

6. The airborne imaging system of claim 1 wherein the assessment system is eccentrically weighted so as to produce pendular motion while suspended from a parachute.

7. The airborne imaging system of claim 1 wherein the assessment system includes an optical imaging device.

8. An airborne imaging system comprising:
a blister housing disposed on a host vehicle; said blister housing having a leading end, a trailing end and a payload area, the leading end aligned with a leading end of the host vehicle:
an air inlet defined by the leading end of said blister housing;
an air channel connecting the air inlet to a power unit disposed within the blister housing;
a command/control system disposed within the payload area operably powered by the power unit; and
a payload ejection system operably coupled to the command center for releasing an assessment system from the payload area; said assessment system including an imaging system, a transmitter, a parachute, and an optical imaging device, wherein the optical imaging device contains an adjustable lens and an adjustable lens mount, said adjustable lens mount fixed before deployment to a set oblique look down angle so as to increase a video-imaging footprint.

9. The airborne imaging system of claim 1 wherein the parachute is a ring vortex or conical parachute.

10. The airborne imaging system of claim 1 wherein the transmitting system includes an antenna.

11. An airborne imaging system comprising:
a blister housing disposed on a host vehicle; said blister housing having a leading end, a trailing end and a payload area, the leading end aligned with a leading end of the host vehicle:
an air inlet defined by the leading end of said blister housing;
an air channel connecting the air inlet to a power unit disposed within the blister housing;
a command/control system disposed within the payload area operably powered by the power unit; and
a payload ejection system operably coupled to the command center for releasing an assessment system from the payload area: said assessment system including an imaging system, a transmitter, and a parachute, where the transmitter includes an antenna and the antenna is a plurality of conductors enclosed within the ring vertex or conical parachute.

12. An airborne imaging system comprising:
a blister housing disposed on a host vehicle; said blister housing having a leading end, a trailing end and a payload area, the leading end aligned with a leading end of the host vehicle:
an air inlet defined by the leading end of said blister housing;
an air channel connecting the air inlet to a power unit disposed within the blister housing;
a command/control system disposed within the payload area operably powered by the power unit; and
a payload ejection system operably coupled to the command center for releasing an assessment system from the payload area; said assessment system including an imaging system, a transmitter, and a parachute, where the transmitter includes an antenna and the antenna is a single conductor that trails the assessment system.

13. The airborne imaging system of claim 1 wherein the parachute is a parafoil design parachute.

14. A method for proving a wide angle continuously updated video mosaic of an area of interest by an airborne imaging system delivered by an airborne platform, said method comprising:
attaching a blister housing to a host vehicle, said blister housing including a sensor system;
streamlining a perimeter interface of the host vehicle and blister housing by applying a layer of aerodynamic tape;
programming a mission profile into the sensor system;
connecting a lanyard from the blister housing to the airborne platform;
directing the host vehicle toward an area for assessment;
detaching the lanyard;
activating a command/control center internal to the blister housing for calculating an optimal deployment schedule;
deploying a sensor system from the blister housing;
decelerating the sensor system by a drag device;
deploying a paradevice from the sensor system;
recording a plurality of individual video frames of an expanded footprint by a videoimaging device onboard the sensor system; and
transmitting the plurality of individual video frames to a processing system that continuously constructs an updated image mosaic of the area of interest.

15. The method of claim 14 wherein the airborne platform is a plane or an unmanned airborne vehicle.

16. The method of claim 14 wherein the blister housing is autonomously powered by an impeller driven generator.

17. The method of claim 16 wherein the impeller driven generator is aerodynamically coupled to an air inlet on a leading edge of the blister housing.

18. The method of claim 17 wherein the air inlet is further aerodynamically coupled to a pressurization system so as to create an overpressure internal to the blister housing.

19. The method of claim 14 wherein the blister housing is autonomously powered by an internal battery.

20. The method of claim 14 wherein deploying the sensor system includes the release of a blister housing cover.

21. The method of claim 14 wherein the sensor system is eccentrically weighted so as to create pendular motion.

22. The method of claim 21 wherein the video-imaging device includes a lens system with an adjustable camera look down angle.

23. The method of claim 22 wherein a range for the adjustable camera look down angle is twenty degrees to sixty degrees.

24. The method of claim 14 wherein the paradevice is a ring vortex or a conical parachute so as to create an angular motion of the sensor system.

25. The method of claim 24 wherein transmitting the plurality of individual video frames is through an antenna system contained within the ring vortex or the conical parachute.

26. The method of claim 14 wherein the sensor system is suspended from a parafoil, said parafoil having active control surfaces for extending a loiter time at the area of interest.

27. An airborne imaging system remotely connected to a laptop receiving station comprising:
  a blister package including:
  a blister housing operably connected to a host vehicle;
  a command/control section positioned within said blister housing to sense a desired orientation of said blister housing;
  a power system operably connected to the command/control system; and
  an assessment sensor system, selectively deployed from the blister package upon achieving the desired orientation, said assessment sensor system including;
  an eccentrically weighted imaging payload;
  a paradevice to suspend and rotate the eccentrically weighted imaging payload; and
  a transmitter system that communicates a sensor output with the laptop receiving station.

* * * * *